(12) United States Patent
Yamauchi et al.

(10) Patent No.: US 7,830,098 B2
(45) Date of Patent: Nov. 9, 2010

(54) PROJECTOR AND LIGHT SOURCE DEVICE THEREOF

(75) Inventors: Kentaro Yamauchi, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 530 days.

(21) Appl. No.: 11/972,810

(22) Filed: Jan. 11, 2008

(65) Prior Publication Data

US 2008/0186456 A1    Aug. 7, 2008

(30) Foreign Application Priority Data

Feb. 6, 2007    (JP)    ............................. 2007-026454

(51) Int. Cl.
H05B 37/02    (2006.01)
G03B 21/20    (2006.01)

(52) U.S. Cl. ........................................ 315/291; 353/85

(58) Field of Classification Search .............. 315/291, 315/307; 353/85, 98; 359/238, 838, 850, 359/871
See application file for complete search history.

(56) References Cited

U.S. PATENT DOCUMENTS

| | | | |
|---|---|---|---|
| 5,491,525 A | 2/1996 | Yamasaki et al. | |
| 6,504,323 B2 * | 1/2003 | Yuda et al. | 315/307 |
| 7,040,768 B2 | 5/2006 | Fujisawa et al. | |
| 7,122,960 B2 * | 10/2006 | Tukamoto et al. | 313/576 |
| 7,288,899 B2 | 10/2007 | Akiyama | |
| 7,661,830 B2 * | 2/2010 | Takezawa et al. | 353/99 |
| 7,771,056 B2 * | 8/2010 | Kimura et al. | 353/98 |

FOREIGN PATENT DOCUMENTS

| | | |
|---|---|---|
| JP | U-56-059708 | 10/1979 |
| JP | A-6-75222 | 3/1994 |
| JP | A-8-31382 | 2/1996 |
| JP | A-11-143378 | 5/1999 |
| JP | A-2001-66697 | 3/2001 |
| JP | A-2003-347071 | 12/2003 |
| JP | A-2005-19141 | 1/2005 |
| JP | A-2006-4919 | 1/2006 |
| JP | A-2006-30378 | 2/2006 |
| WO | WO 2004/086453 A1 | 10/2004 |
| WO | WO 2004/104689 A1 | 12/2004 |

* cited by examiner

Primary Examiner—Thuy Vinh Tran
(74) Attorney, Agent, or Firm—Oliff & Berridge, PLC (57) ABSTRACT

A light source device includes: a first electrode and a second electrode, a light emitting tube, a main reflection mirror disposed on the first electrode side, a sub reflection mirror disposed on the second electrode side and a current driving device which supplies alternating current and performs power control such that supply energy during an anode period of the first electrode becomes smaller than supply energy during a cathode period of the first electrode at least a predetermined period immediately before a stable operation starts in the period from the start of power supply to the first and second electrodes to the start of the stable operation.

10 Claims, 10 Drawing Sheets

PROJECTOR AND LIGHT SOURCE DEVICE THEREOF

BACKGROUND

1. Technical Field

The present invention relates to a light source device having a pair of electrodes and main and sub reflection mirrors, and further relates to a projector including this light source device.

2. Related Art

A certain type of light source lamp included in a projector has an auxiliary mirror capable of utilizing light from a light emitting tube as effectively as possible. According to this type of light source lamp, the temperature of an auxiliary mirror side electrode as one of two electrodes included in the light emitting tube increases in some cases due to adoption of a sub reflection mirror such as the auxiliary mirror. Thus, a technology of increasing the heat capacity of the auxiliary mirror side electrode for the purpose of temperature control has been proposed in WO2004/086453.

According to the light source lamp of the type described above, a part of light reflected by the sub reflection mirror reaches the main mirror side electrode as the other one of the two electrodes disposed on the side opposite to the auxiliary mirror. As a result, the temperature of the main mirror side electrode rapidly increases at the time of start-up of the light source lamp, and the tip of the electrode melts. This causes deterioration of the characteristics of the light source lamp in some cases.

It is possible to prevent rapid increase in the electrode temperature at the start of the light source lamp by decreasing lamp current increase at the start-up. In this case, however, a longer time is required for reaching the rated stable operation of the lamp.

SUMMARY

Accordingly, it is an advantage of some aspects of the invention to provide a light source device capable of achieving rapid start while reducing deterioration of an electrode at the time of start-up caused by the effect of light reflected by a sub reflection mirror such as an auxiliary mirror, and to provide a projector including this light source device.

A light source device according to a first aspect of the invention includes: a first electrode and a second electrode which cause light emission by electrical discharge between each other; a light emitting tube having a main body containing a discharge space which separates the first and second electrodes disposed within the main body, and sealing portions provided at both ends of the main body; a main reflection mirror disposed on the first electrode side to reflect source light generated by the discharge between the first and second electrodes and emit the reflected light toward an illuminated area; a sub reflection mirror disposed on the second electrode side at a position opposed to the main reflection mirror to reflect the source light toward the main reflection mirror side; and a current driving device which supplies alternating current for causing electrical discharge between the first and second electrodes to the first and second electrodes, and performs power control such that supply energy during an anode period of the first electrode becomes smaller than supply energy during a cathode period of the first electrode at least a predetermined period immediately before a stable operation starts in the period from the start of power supply to the first and second electrodes to the start of the stable operation.

According to the light source device of the first aspect of the invention, the power control of the alternating current is performed by the current driving device such that the supply energy during the anode period of the first electrode becomes smaller than the supply energy during the cathode period of the first electrode at least during the predetermined period immediately before the stable operation starts. This power control prevents rapid temperature increase of the first electrode immediately before the stable operation starts, thereby prolonging the life of the light source device. More specifically, even when the first-electrode is damaged by the discharge and entering reflection light from the sub mirror at the time of start-up, the difference between damages given on both the electrodes by the discharge and reflection light can be equalized with the control over the supply energies. As a result, early deterioration of the electrodes can be prevented. In addition, according to the light source device of this aspect of the invention, the entire quantity of the supply power is kept comparatively large by relatively increasing the supply energy supplied when the second electrode is the anode at the time of star-up from the start of power supply to the first and second electrodes to the stabilized condition. Thus, rapid starting of the light source device can be secured.

It is preferable that the current driving device supplies substantially constant current to the first and second electrodes during the period from the start of power supply to the first and second electrodes to the start of the stable operation. The substantially constant current herein refers to that leveled alternating current is substantially constant. The substantially constant current is not limited to accurately constant current throughout the start-up period but may be current appropriately increased or decreased according to the characteristics of the light emitting tube during the start-up period. Thus, the rated stable operation can be achieved relatively rapidly without necessity for excessive load applied to the first and second electrodes. Accordingly, rapid starting of the light source device can be realized.

It is preferable that the current driving device performs the power control by controlling time ratio of the anode period to the cathode period of the first electrode. By this control, a predetermined difference between the supply energy during the anode period of the first electrode and the supply energy during the cathode period of the first electrode can be produced even when there is no difference in the current absolute value between the anode period and the cathode period, for example.

It is preferable that the current driving device performs the power control by controlling current ratio of the anode period to the cathode period of the first electrode. By this control, a predetermined difference between the supply energy during the anode period of the first electrode and the supply energy during the cathode period of the first electrode can be similarly produced.

It is preferable that the main reflection mirror and the sub reflection mirror have reflection curved surfaces which are substantially axis-symmetrical with respect to an optical axis, and that the electrode axes of the first and second electrodes are disposed at positions substantially coinciding with the position of the optical axis. In this case, in the discharge, the light emission center located between the first and second electrodes is disposed at a position substantially corresponding to the optical axis. Thus, the source light can be effectively utilized by using the main reflection mirror and the sub reflection mirror, and can be emitted to the appropriate illuminated area.

A projector according to a second aspect of the invention includes: any one of the light source devices described above;

a light modulating device illuminated by illumination light emitted from the light source device; and a projection optical system which projects image light having passed through the light modulating device.

The projector according to the second aspect of the invention uses any one of the light source devices described above. Thus, degradation caused at the time of start of the light source is reduced, and the life of the light source is prolonged.

BRIEF DESCRIPTION OF THE DRAWINGS

The invention will be described with reference to the accompanying drawings, wherein like numbers refer to like elements.

DESCRIPTION OF EXEMPLARY EMBODIMENTS

First Embodiment

Figure 1:
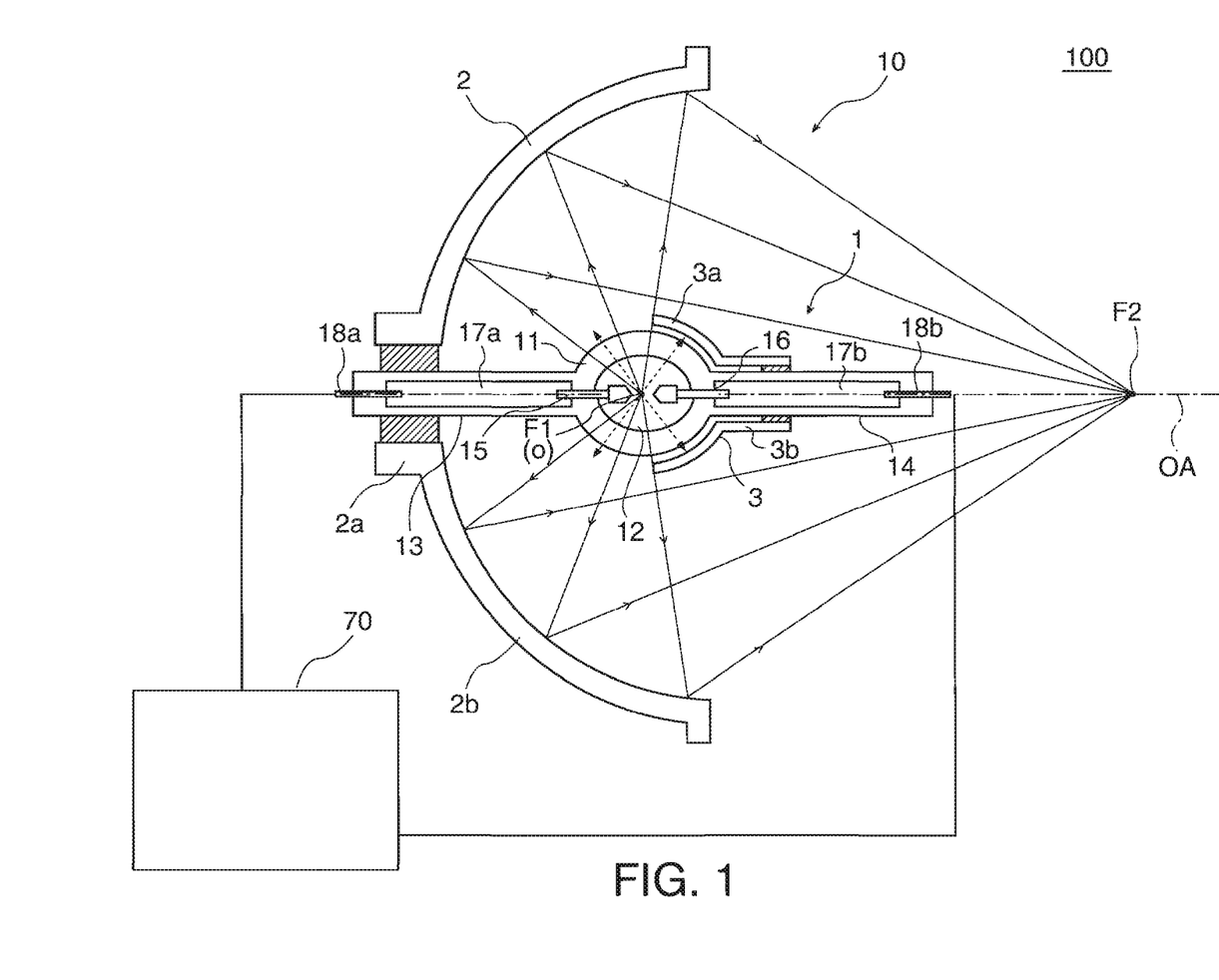
FIG. 1 is a cross-sectional view illustrating a light source device according to a first embodiment.

FIG. 1 is a cross-sectional view illustrating a light source device according to a first embodiment of the invention. A light source device 100 in this embodiment includes a light source unit 10 and a current driving device 70. The light source unit 10 has a discharge-emission-type light emitting tube 1, a reflector 2 as an ellipsoidal main reflection mirror, and a sub mirror 3 as a spherical sub reflection mirror. The current driving device 70 is an electric circuit for supplying alternating current to the light source unit 10 such that the light source unit 10 can emit light in a desired manner.

The light emitting tube 1 included in the light source unit 10 is constituted by a light-transmissive quartz glass tube whose central area are expanded to form a spherical shape. The light emitting tube 1 has a main body 11 which emits light for illumination, and first and second sealing portions 13 and 14 extending from both ends of the main body 11.

The tip of a first electrode 15 made of tungsten and the tip of a second electrode 16 similarly made of tungsten are disposed within a discharge space 12 formed inside the main body 11 with a predetermined distance left between the tips of the first and second electrodes 15 and 16. Gas as a discharge medium including rare gas, metal halogenide and the like is sealed into the discharge space 12. Metal foils 17a and 17b made of molybdenum and electrically connected with the roots of the first and second electrodes 15 and 16 provided on the main body 11 are inserted into the sealing portions 13 and 14 extending from both ends of the main body 11. Each end of the sealing portions 13 and 14 is sealed from their surroundings by using glass material or the like. When alternating current is applied to leads 18a and 18b connected with the metal foils 17a and 17b by using the current driving device 70, arc discharge is caused between the pair of the electrodes 15 and 16. As a result, the main body 11 emits light with high luminance. As obvious from FIG. 1 the reflector 2 is disposed on the first electrode 15 side, and the sub mirror 3 is disposed on the second electrode 16 side in such a position as to be opposed to the reflector 2. Thus, the first electrode 15 is positioned on the side opposite to the sub mirror 3 with the main body 11 interposed between the first electrode 15 and the sub mirror 3.

An approximately half of the main body 11 of the light emitting tube 1 on the light emission front side is covered by the sub mirror 3. The sub mirror 3 has a sub reflection portion 3a for directing light bundle emitted toward the front from the main body 11 of the light emitting tube 1 such that the light is returned to the main body 11, and a supporting portion 3b fixed to the circumference of the second sealing portion 14 while supporting the root of the sub reflection portion 3a. The supporting portion 3b is so constructed that the second sealing portion 14 can be inserted into the supporting portion 3b, and that the sub reflection portion 3a can be aligned with the main body 11.

The reflector 2 is a quartz glass component having a neck-shaped portion 2a into which the first sealing portion 13 of the light emitting tube 1 is inserted, and a main reflection portion 2b having an ellipsoidal curved surface which expands from the neck-shaped portion 2a. The neck-shaped portion 2a and the main reflection portion 2b are formed integrally with each other. The neck-shaped portion 2a is so constructed that the first sealing portion 13 can be inserted into the neck-shaped portion, and that the main reflection portion 2b can be aligned with the main body 11.

The light emitting tube 1 is disposed along a system optical axis OA corresponding to the optical axis of the main reflection portion 2b in such a position that a light emission center O located between the first and second electrodes 15 and 16 in the main body 11 coincides with a first focus F1 position of the ellipsoidal curved surface of the main reflection portion 2b. When the light emitting tube 1 is turned on, light bundle emitted from the main body 11 is reflected by the main reflection portion 2b, or reflected first by the sub reflection portion 3a and further reflected by the main reflection portion 2b. The reflected light bundle is then converged at a second focus F2 position of the ellipsoidal curved surface. Thus, the reflector 2 and the sub mirror 3 have reflection curved surfaces substantially axis-symmetrical with respect to the system optical axis QA, and the pair of the electrodes 15 and 16 are disposed such that the electrode axes as their central axes coincide with the system optical axis OA.

Figure 2A:
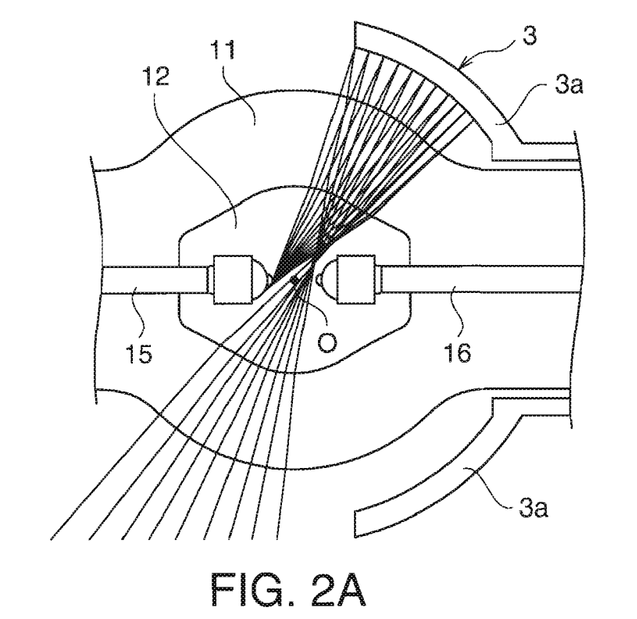
FIG. 2A is an enlarged cross-sectional view illustrating light reflected by a sub reflection mirror.
Figure 2B:
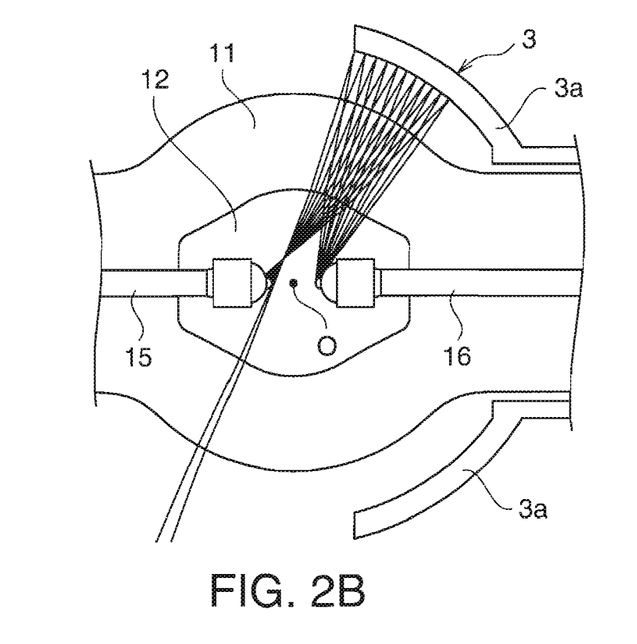
FIG. 2B is an enlarged cross-sectional view illustrating light reflected by the sub reflection mirror.

FIGS. 2A and 2B are enlarged cross-sectional views illustrating reflection of source light reflected by the sub mirror 3 provided on the light source unit 10. The sub reflection portion 3a of the sub mirror 3 is designed such that source light emitted from the light emission center O in the lights emitted by the arc discharge caused between the first and second electrodes 15 and 16 within the main body 11 is returned toward the light emission center O. Also, the sub reflection portion 3a is constructed such that the source light emitted from a distant position from the light emission center O is returned toward a distant position from the light emission center O. More specifically, as illustrated in FIG. 2A, source light emitted from the vicinity of the first electrode 15 is temporarily converged at the opposite position around the second electrode 16 by the sub reflection portion 3a, and then emitted from the inside of the main body 11 to the outside without being blocked by the sub mirror 3. On the other hand, as illustrated in FIG. 2B, source light emitted from the vicinity of the second electrode 16 is converged at the opposite position around the first electrode 15 by the sub reflection portion 3a. In this case, most of the light bundle is blocked by the first electrode 15. The source light blocked by the first electrode 15 side opposed to the sub reflection portion 3a is not only effectively utilized but also damages the first electrode 15 with high possibility. Thus, the areas around the tips of the first and second electrodes 15 and 16 are easily damaged by the arc discharge. Particularly, when reflection light from the sub reflection portion 3a reaches the first electrode 15 as described above at the time of startup as a preparatory step for lighting start of the light source unit 10, damage equivalent to Fusion and deterioration due to heating around the tip of the first electrode 15 rapidly increases. This causes early deterioration of the light source unit 10.

Figure 3:
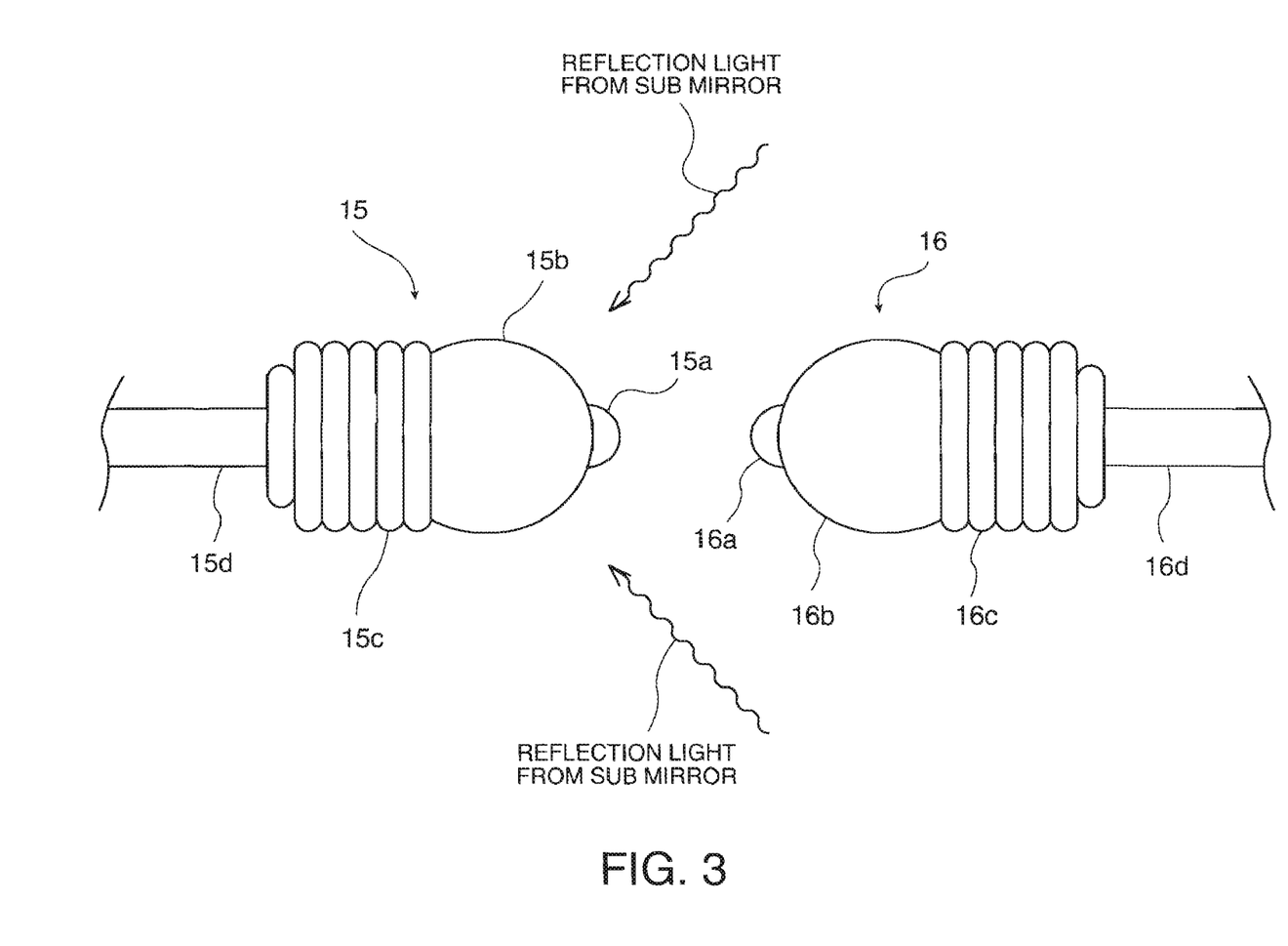
FIG. 3 is an enlarged view illustrating an example of tips of a pair of electrodes and their surroundings.

FIG. 3 is an enlarged view illustrating the tips of the first and second electrodes 15 and 16 and their surroundings. The first and second electrodes 15 and 16 have tips 15a and 16a, weld large-diameter portions 15b and 16b, coils 15c and 16c, and shafts 15d and 16d. The tips of the first and second electrodes 15 and 16 and their surroundings are formed by winding tungsten around the shafts 15d and 16d and dissolving the tungsten. That is, the weld large-diameter portions 15b and 16b are initially formed by dissolution, and the tips 15a and 16a are formed at the tips of the formed large-diameter portions 15b and 16b by dissolution. In this case, the remaining portions of the wound tungsten which have not been dissolved become the coils 15c and 16c. Since the first and second electrodes 15 and 16 have the mass-shaped weld large-diameter portions 15b and 15-b, the heat capacities of the first and second electrodes 15 and 16 increase.

The tips 15a and 16a of the first and second electrodes 15 and 16 determine the distance of discharge between the electrodes within the light emitting tube 1, and become portions for chiefly receiving collisions of electrons at the time of discharge. Thus, the respective tips 15a and 16a easily receive excessive heat and damage caused by current generated at the time of arc discharge. The excessive heat and damage increase particularly by the arc discharge during the final period immediately before the start of stable operation at the time of start-up. In this case, especially heat and damage given to the anode side which receives electrons in the components of the electrodes 15 and 16 are relatively large. According to the structure using alternating current, the polarities of the first electrode 15 and the second electrode 16 periodically switch, and therefore both the electrodes 15 and 16 can become the anode side or the cathode side.

As discussed with reference to FIGS. 2A and 2B, damage caused by a part of reflection light having passed through the sub reflection portion 3a mentioned above in the light generated by the arc discharge between the electrodes 15 and 16 increases particularly on the tip 15a side of the first electrode 15 side, and thus causes gradual degradation of the tip 15a every time the lighting starts. More specifically, reflection light having high luminance and reaching the tip 15a of the first electrode 15 side excessively heats the tip 15a together with the arc discharge during the final period immediately before the start of the stable operation particularly at the time of start-up. In this case, the first electrode 15 is excessively heated by the multiplied effect of the reflection light reaching the tip 15a with high luminance equivalent to the stable operation and a large quantity of electrons entering the tip 15a as a result of the arc discharge during the final period. Consequently, degradation, that is, damage caused thereby accelerates.

Figure 4:
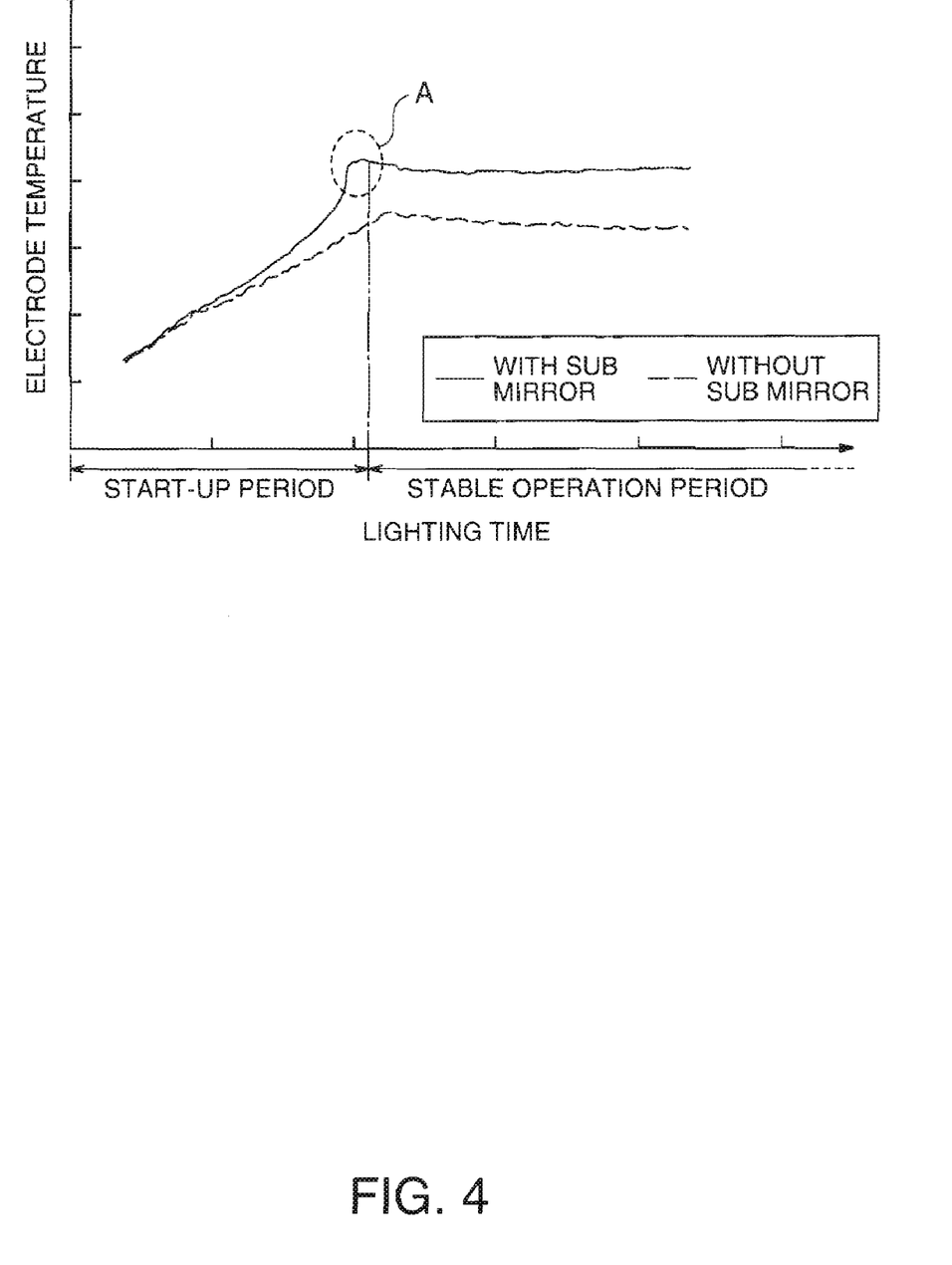
FIG. 4 is a graph showing temperature fluctuations of a first electrode at the time of start-up of a light source unit.

FIG. 4 is a graph showing temperature fluctuations of the first electrode 15 at the time of start of the light source unit 10 according to the related art appended for reference. The horizontal axis indicates lighting time, and the vertical axis indicates the electrode temperature, i.e. the temperature of the tip 15a. In this graph, the solid line shows the electrode temperature of the first electrode 15 of the light source unit 10 having the sub mirror 3 in a first comparison example, and a dotted line shows the electrode temperature of the first electrode 15 of the light source unit 10 not having the sub mirror 3 in a second comparison example. The light source unit 10 of the first comparison example has no structural difference from the light source unit 10 according to this embodiment, but energy supplied when the first electrode 15 is the anode and energy supplied when the second electrode 16 is the anode are equalized. In case of the light source unit 10 in the first comparison example, the electrode temperature at the tip 15a of the first electrode 15 side rapidly increases immediately before change to the stable operation where the light source unit 10 is driven by constant power at the time of start-up as constant current driving as apparent from the graph (see A region in the graph). In case of the light source unit 10 of the second comparison example, the phenomenon as the above-mentioned first comparison example that the electrode temperature at the tip 15a of the first electrode 15 side rapidly increases immediately before the change from the start-up to the stable operation is not recognized. Thus, it is considered that the increase in the electrode temperature of the first electrode 15 immediately before the switch from the start-up to the stable operation is caused by the presence of the sub mirror 3, that is, the reflection light entering from the sub reflection portion 3a into the first electrode 15.

According to this embodiment, for reducing life decrease of the light source unit 10 caused by degradation of the first electrode 15 as discussed above, difference between energies to be supplied to the first and second electrodes 15 and 16 when the electrodes 15 and 16 are the anode is produced by performing power control using the current driving device 70 during the start-up period from the start of feeding to the first and second electrodes 15 and 16 to stabilized condition, or at least during the final period immediately before the start of the constant operation in the start-up period so as to reduce damage caused by rapid increase in the temperature of the first electrode 15. It has been confirmed from experiments that, when damage to the first electrode 15 is avoided during the final period as mentioned above, dissolution of the tip 15a of the first electrode 15 can be prevented during the stable operation after the final period, that is, while driving by the rated power.

Figure 5:
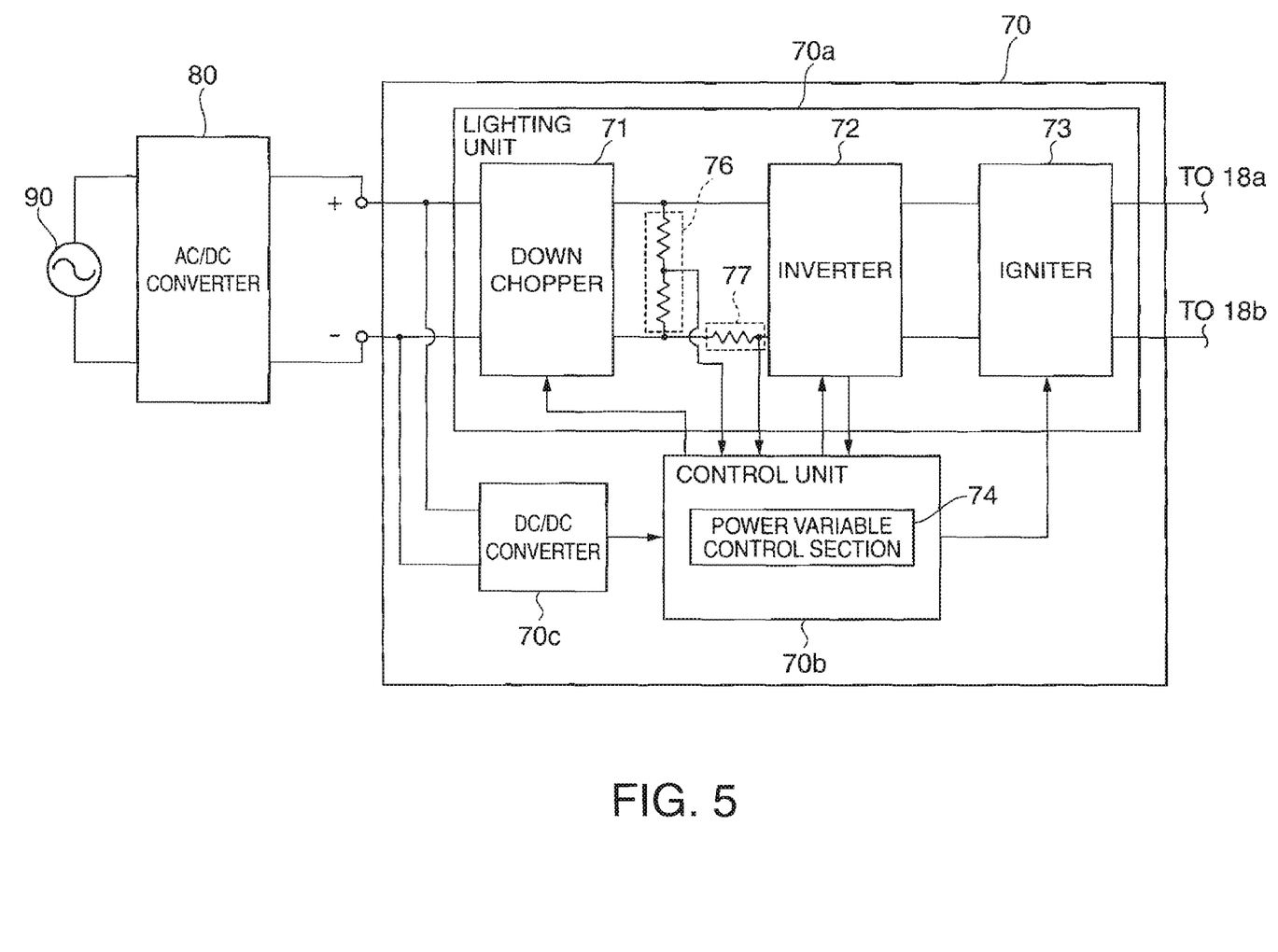
FIG. 5 is a block diagram showing a structure of a current driving device incorporated in the light source unit.

FIG. 5 is a block diagram schematically showing the structure of the current driving device 70. The current driving device 70 generates alternating current for causing discharge between the pair of the electrodes 15 and 16 shown in FIG. 1 or other figures, and controls supply condition of the alternating current supplied to the electrodes 15 and 16. The current driving device 70 has a lighting unit 70a, a control unit 70b, and a DC/DC converter 70c. According to this embodiment the current driving device 70 uses an external power source. More specifically, the current driving device 70 is connected with an AC/DC converter 80, and the AC/DC converter 80 is connected to a commercial power supply 90. The AC/DC converter 80 converts alternating current supplied from the commercial Dower supply 90 into direct current.

The lighting unit 70a is a section for effecting lighting operation of the light source unit 10 in FIG. 1. As shown in FIG. 5, the lightning unit 73a has a down chopper 71, an inverter circuit 72, an igniter 73, a lamp voltage detecting circuit 76, and a lamp current detecting circuit 77.

The down chopper 71 receives direct current from the AC/DC converter 80, decreases the inputted voltage to appropriate dc voltage, and supplies the resultant voltage to the inverter circuit 72. The down chopper 71 controls the duty ratio (ratio of ON time per unit time to OFF time per unit time) of periodic cut-off operation by built-in switching element under the control of the control unit 70b. The output voltage from the down chopper 71 is thus controlled.

The inverter circuit 72 converts the direct current supplied from the down chopper 71 into alternating current having predetermined frequency and supplies the resultant current to the light source unit 10 shown in FIG. 1. The Inverter circuit 72 has a pair of inverters constituted by switching elements, and controls the timing for alternately turning on and off the sets of two switching elements under the control of control unit 70b. The duty ratio of the output waveform and the positive/negative voltage ratio from the inverter circuit 72 are thus controlled.

The igniter 73 has a not-shown boosting circuit and functions as a section for applying direct current and high voltage pulse between the pair of the electrodes 15 and 16 shown in FIG. 1 for a short period at the time of lighting start of the light source unit 10 so as to cause electric breakdown and produce discharge path.

The lamp voltage detecting circuit 76 is disposed between a pair of power supply lines to detect operation voltage of the light source unit 10. The detection voltage obtained by the lamp voltage detecting circuit 76 is outputted to the control unit 70b.

The lamp current detecting circuit 77 is provided on one of the power supply lines to detect operation current of the light source unit 10. The detection current obtained by the lamp current detecting circuit 77 is outputted to the control unit 70b.

The control unit 70b is constituted by a micro-processor or other devices, and controls the operation of the lighting unit 70a. The control unit 70b is driven by appropriate driving voltage generated by the DC/DC converter 70c.

The control unit 70b has a function of performing various controls. More specifically, a power variable control section 74 provided on the control, unit 70b operates the igniter 73 at the time of lighting start such that the light source unit 10 can start light emission. Also, the control unit 70b drives the light source unit 10 by constant current under the control of the down chopper 71 during the subsequent period of start-up, and drives the light source unit 10 by constant power under the control of the down chopper 71 during the further subsequent period of stable operation. Particularly at the time of start-up, the power variable control section 74 controls the Inverter circuit 72 such that energy to be supplied when the first electrode 15 is the anode becomes smaller than that when the second electrode 16 is the anode so as to reduce damage to the first electrode 15. For achieving these functions, the power variable control section 74 manages the operations of the igniter 73, the down chopper 71, the inverter circuit 72 and other components under the control program, and controls the driving voltage and driving current to be supplied from the lighting device 70a to the leads 18a and 18b of the light source unit 10 shown in FIG. 1. For examples the amplitude of voltage is adjustable by controlling the output voltage through the control of the down chopper 71, and the amplitude of current is similarly adjustable by controlling the output current through the control of the down chopper 71. In addition, each period of the anode and cathode and the maximum absolute value of current at the time of the anode or cathode are adjustable by controlling the duty ratio of the output waveform or the positive/negative voltage or current ratio through the control of the inverter circuit 72, for example.

Returning to FIG. 1, with initiation of lighting of the light emitting tube 1 contained in the light source unit 10 by the operation of the current driving device 70, high voltage is applied between the first and second electrodes 15 and 16 and discharge path is produced therebetween as discussed above. As a result, arc discharge is generated. This discharge gradually increases the temperature inside the discharge space 12, and gradually heats and vaporizes gas as discharge medium. Consequently, light emission phenomenon appears at the light emission center O and its surrounding, and the light emission luminance gradually increases. In this step, the power variable control section 74 supplies constant current between the electrodes 15 and 16 of the light source unit 10 for one to several minutes at the start-up, i.e., until the operation shifts to the stable operation by controlling the operation condition of the down chopper 71 so as to safely operate the light emitting tube 1 operating at low voltage. Subsequently, the power variable control section 74 switches the operation of the light emitting tube 1 to the stable operation after the operation voltage of the light emitting tube 1 sufficiently increases. That is, the power variable control section 74 supplies constant power between the electrodes 15 and 16 of the light source unit 10 by controlling the operation condition of the down chopper 71.

For the constant current control at the time of start-up discussed above, the power variable control section 74 controls power such that current to be supplied when the first electrode 15 is the anode becomes smaller than current to be supplied when the second electrode 16 is the anode by controlling the operation condition of the Inverter circuit 72. Also, for the constant current control at the time of start-up discussed above, the power variable control section 74 controls power such that the time during which the first electrode 15 is the anode becomes shorter than the time during which the second electrode 16 is the anode by controlling the operation condition of the inverter circuit 72. By these power controls, the temperature increase of the first electrode 15 and the damage given thereby can be reduced even when the reflection light from the sub mirror 3 reaches the first electrode 15.

Figure 6:
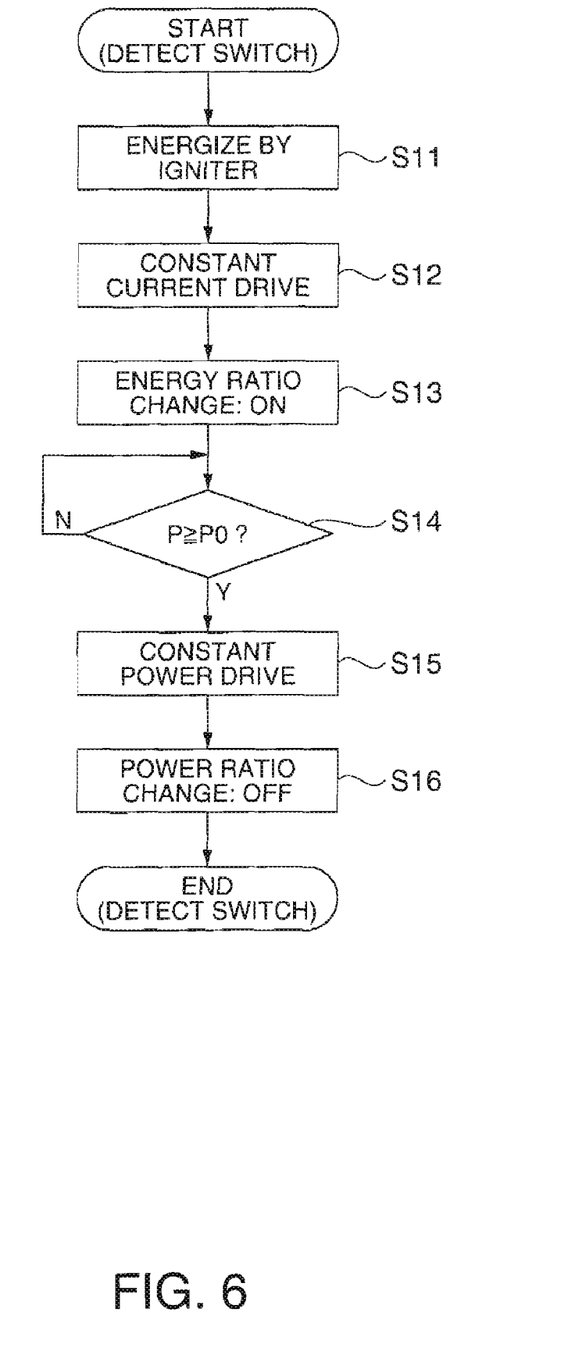
FIG. 6 is a flowchart showing operation of the light source unit.

FIG. 6 is a flowchart showing an operation example of the current driving device 70. The control unit 70b detects operation of a turn-on switch and starts processing. Initially, the control unit 70b operates the igniter 73 such that the light emitting tube 1 of the light source unit 10 starts discharge (step S11). Then, the control unit 70b appropriately operates the down chopper 71 via the power variable control section 74 such that the light source unit 10 emits light by constant current (step S12). Subsequently, the control unit 70b starts adjustment of the ratio of energies supplied to the first and second electrodes 15 and 16 by appropriately operating the inverter circuit 72 via the power variable control section 74 (step S13). In this step, the energy supplied to the first electrode 15 of the light source unit 10 when the first electrode 15 is the anode becomes smaller than the energy supplied to the second electrode 16 when the second electrode 16 is the anode. Then, the control unit 70b judges whether power P supplied to the light source unit 10 has reached a target value P0 by using the detection outputs from the detecting circuits 76, 76 or the like (step S14). Since the initial resistance of the light emitting tube 1 is low but gradually increases at the time of start-up, the power P supplied to the light source unit 10 gradually increases with the constant current driving of the light source unit 10. When it is judged that the power P supplied to the light source unit 10 has reached the target value P0 at which the stable operation is possible, the control unit 70b appropriately operates the down chopper 71 via the power variable control section 74 such that the light source unit 10 emits light by constant power (step S15). Simultaneously, the control unit 70b stops the adjustment of the ratio of energies supplied to the first and second electrodes 15 and 16 by appropriately operating the inverter circuit 72 via the power variable control section 74 (step S1.6). Thus, the energy supplied to the first electrode 15 when the first electrode 15 is the anode becomes substantially equivalent to the energy supplied to the second electrode 16 when the second electrode 16 is the anode.

Figure 7:
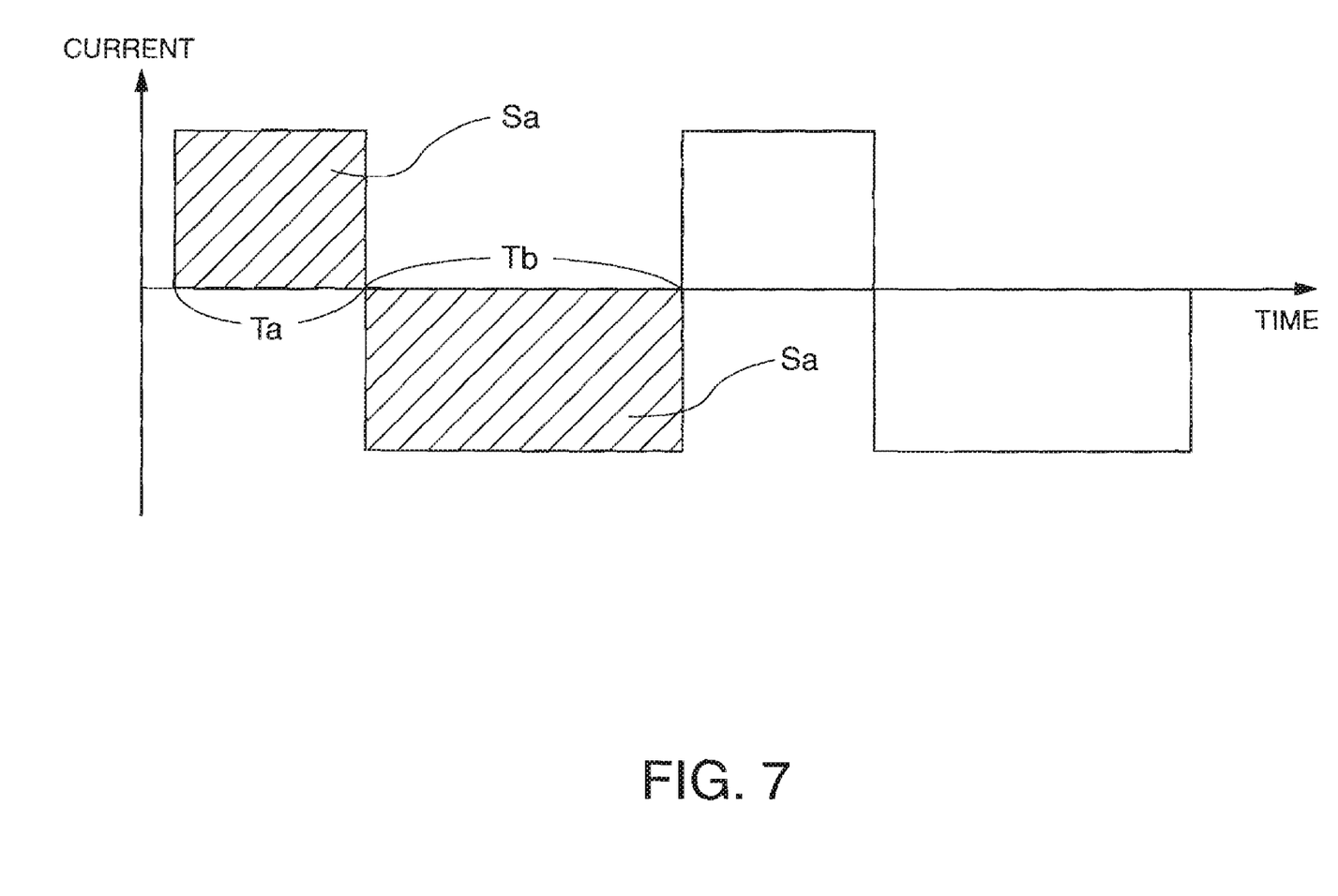
FIG. 7 is a graph showing an operation waveform example of the current driving device show in FIG. 5.

FIG. 7 is a graph showing an example of the operation waveform generated by the current driving device 70 at the time of start-up. This figure explains the power control performed in step S13 in FIG. 6, that is, the adjustment of the ratio of energies supplied to the first and second electrodes 15 and 16. In this figure, the horizontal axis indicates time, and the vertical axis indicates values of current supplied to the first electrode 15. The period during which the current is positive corresponds to an anode period Ta of the first electrode 15 (cathode period of second electrode 16), and the period during which the current is negative corresponds to a cathode period Tb of the first electrode 15 (anode period of second electrode 16). As apparent from FIG. 7, the current driving device 70 controls Dower by controlling the time ratio of the anode period Ta to the cathode period Tb of the first electrode 15. In this case, particularly the time during which the first electrode 15 is the anode is made shorter than the time during which the first electrode 15 is the cathode. That is, the anode period Ta of the first electrode 15 is shorter than the cathode period Tb of the first electrode 15 (Ta<Tb) in one cycle of alternating current supplied to the first and second electrodes 15 and 16. By this control, the supply energy during the anode period becomes smaller than the supply energy during the cathode period. The "supply energy" herein refers to a cumulative value of consumed power within a fixed time. Thus, "supply energy during anode period" refers to a cumulative value of consumed power within the period when the first electrode 15 functions as the anode. Similarly, "supply energy during cathode period" refers to a cumulative value of consumed power within the period when the first electrode 15 functions as the cathode. In case of the pulse-type graph having a rectangular waveform shown in FIG. 7, for example, each supply energy corresponds to one cumulative value indicated by a corresponding area Sa or Sb of a rectangle formed when the current value is positive or negative. Thus, the supply energies are controlled as Sa<Sb in this case.

The time ratio of the anode period Ta to the cathode period Tb of the first electrode 15 at the time of start-up may be determined as a time ratio which can reduce damage based on measured and statistically processed damage level given on the first electrode 15 by the reflection light from the sub mirror 3, for example. However, the method of determining the time ratio is not limited to this method. In the specific operation example, the ratio of the anode period Ta to the cathode period Tb is set within the range from about 0.3 to 0.4. It has been confirmed from the experiments that the tip temperature of the first electrode 15 can be decreased to a temperature substantially equal to the tip temperature of the second electrode 16.

Figure 8:
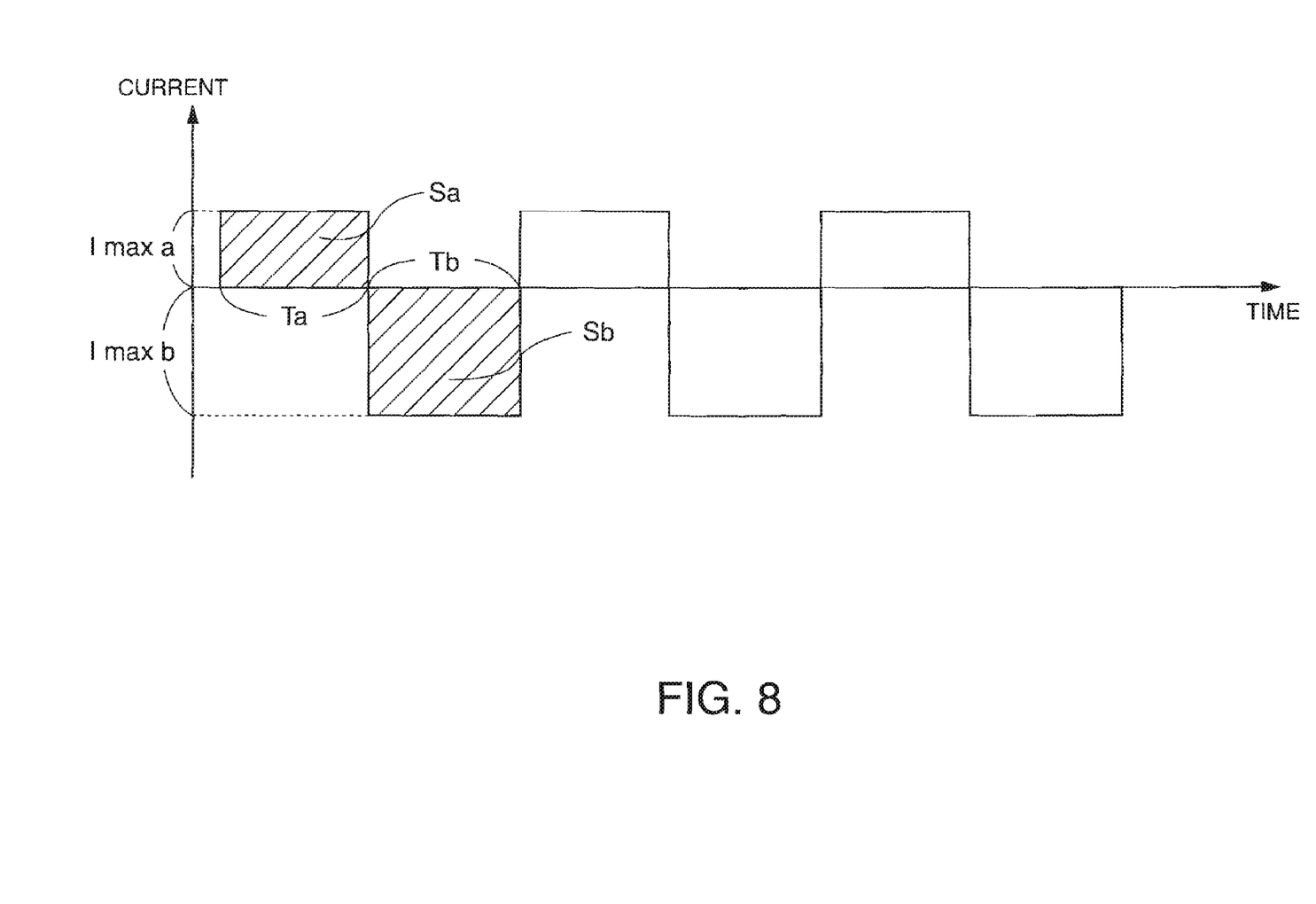
FIG. 8 is a graph showing another operation waveform example of the current driving device shown in FIG. 5.

Alternatively, power control can be performed by controlling the current ratio of the anode period Ta to that of the cathode period Tb of the first electrode 15 as shown in FIG. 8, for example. More specifically, in case of the method shown in FIG. 8, peak current values Imaxa and Imaxb as the maximum current absolute values during the anode period and cathode period are determined such that the peak current value Imaxa during the anode period becomes smaller than the peak current value Imaxb during the cathode period (Imaxa<Imaxb). In this case, even when the anode period Ta is equal to the cathode period Tb (Ta=Tb), for example, the areas Sa and Sb indicating the supply energies can be set as Sa<Sb. It is possible to control both the periods Ta and Tb and the peak current values Imaxa and Imaxb. In any cases, power control can be performed such that the supply energy during the anode period of the first electrode 15 becomes smaller than the supply energy during the cathode period of the first electrode 15 with a desired ratio.

Accordingly, by power control using the current driving device 70 at the time of start-up, the supply energy during the anode period becomes smaller than the supply energy during the cathode period for the first electrode 15. This power control reduces the phenomenon of the electrode temperature increase of the first electrode 15 immediately before the change from the start-up to the stable operation shown in FIG. 4, thereby prolonging the life of the light source unit 10. More specifically, even when the first electrode 15 is damaged by the entering reflection light from the sub mirror 3 as well as by the discharge at the time of start-up, the difference between damages given on the electrodes 15 and 16 by the discharge and reflection light can be equalized with the control over the supply energies in accordance with the conditions of the electrodes 15 and 16 whether they are the anode or cathode. As a result, early deterioration of the first electrode 15 can be prevented. In this case, the entire quantity of the supply power is kept comparatively large similarly to the related art structure at the time of the star-up period from the start of power supply to the first and second electrodes 15 and 16 to the stabilized condition. Thus, rapid starting of the light source unit 10 can be secured.

Figure 9:
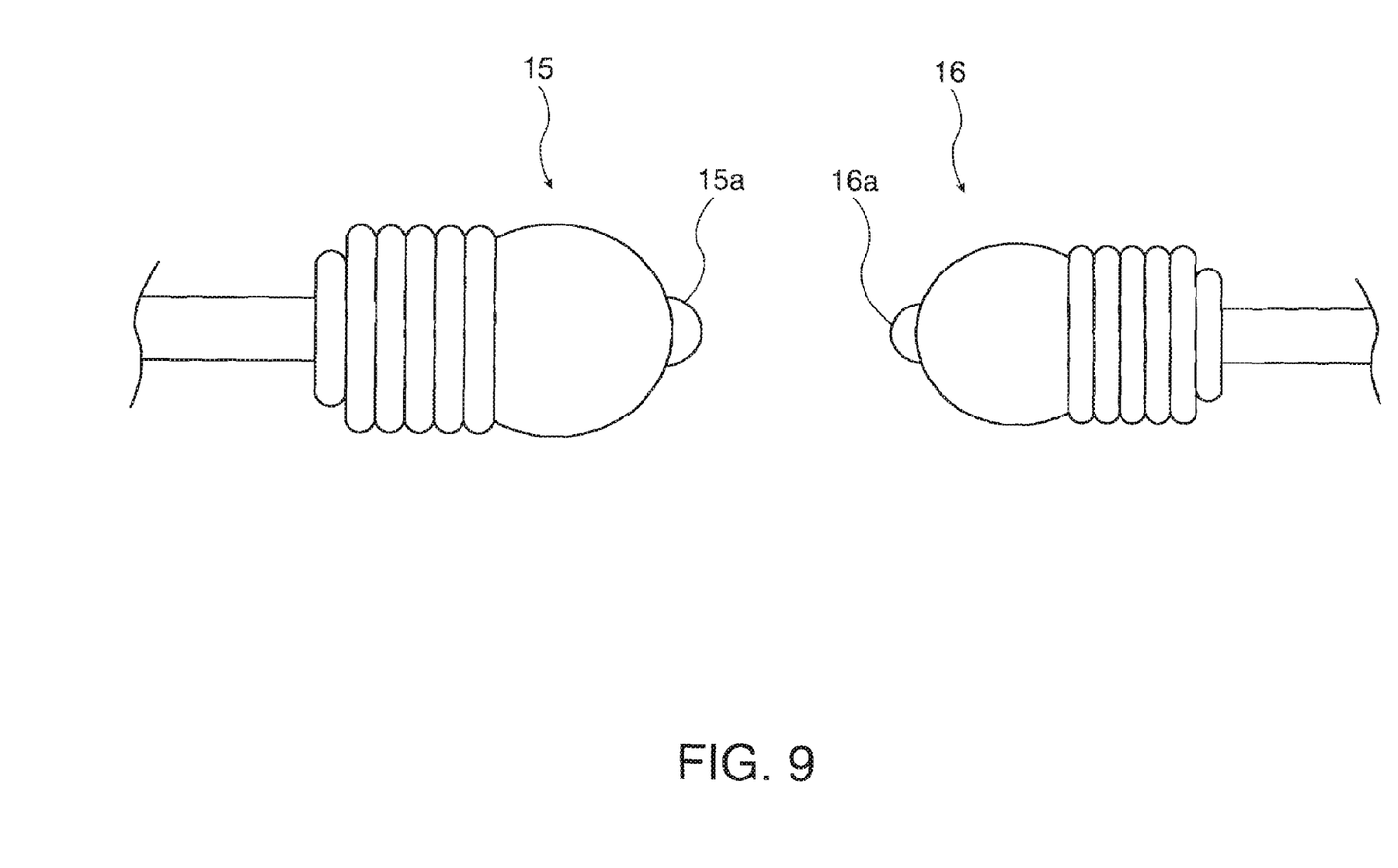
FIG. 9 is an enlarged view illustrating tips of a pair of electrodes and their surroundings in another example.

In addition to the above techniques, the size of the tip 15a of the first electrode 15 and its surrounding may be made larger than the size of the tip 16a of the second electrode 16 and its surrounding as illustrated in FIG. 9, for example. In this case, the heat capacity of the first electrode 15 increases, and temperature increase is less easily caused than in the structure of the second electrode 16. Accordingly, resistibility to the damage given by the arc discharge immediately before the stable operation enhances. When a difference in damage is produced even in this case by adding the damage level or the like given by the reflection light from the sub mirror 3, this difference is statistically measured and control can be performed such that the supply energy supplied during the anode period is unequal to the supply energy supplied during the cathode period for the first electrode 15 based on the statistically measured difference similarly to the method discussed above. In this case, the difference between the respective supply energies may be smaller than that in the case where the respective electrode sizes are equal. According to this method, it is preferable that the size of the first electrode 15 is limited to a size which does not decrease light utilization efficiency by blocking light produced by the arc discharge, for example. Thus, the difference between the respective supply energies may be controlled considering this point.

According to the light source device described above, the lamp used in the light source unit 10 may be of various types such as high-pressure mercury lamp and metal halide lamp.

According to this embodiment, both the voltage and current applied by the current driving device 70 have quadrangular waveforms. However, these waveforms may be others such as triangular waves. In this case, the current peak value or the supply energy during the anode period of the first electrode 15 may be so controlled as to become smaller than the current peak value or the supply energy during the cathode period of the first electrode 15.

According to this embodiment, the supply energy during the anode period of the first electrode 15 becomes smaller than the supply energy during the cathode energy of the first electrode 15 throughout the start-up period from the start of power supply to the first and second electrodes 15 and 16 to the stabilized condition. However, the current driving device 70 may control such that the supply energy during the anode period of the first electrode 15 becomes smaller than the supply energy during the cathode energy of the first electrode 15 only during the final period immediately before the change from the start-up to the stable operation.

According to this embodiment, light emission is effected by constant current at the time of start-up until the operation of the light emitting tube 1 is stabilized. However, constant current need not be supplied to the light emitting tube 1 throughout the start-up period, but the current supplied to the light emitting tube 1 may be so controlled as to gradually vary to more securely maintain the stable operation of the light emitting tube 1

Second Embodiment

While the light source device according to the first embodiment of the invention has been discussed, a projector including the light source device according to the first embodiment is now described in a second embodiment.

Figure 10:
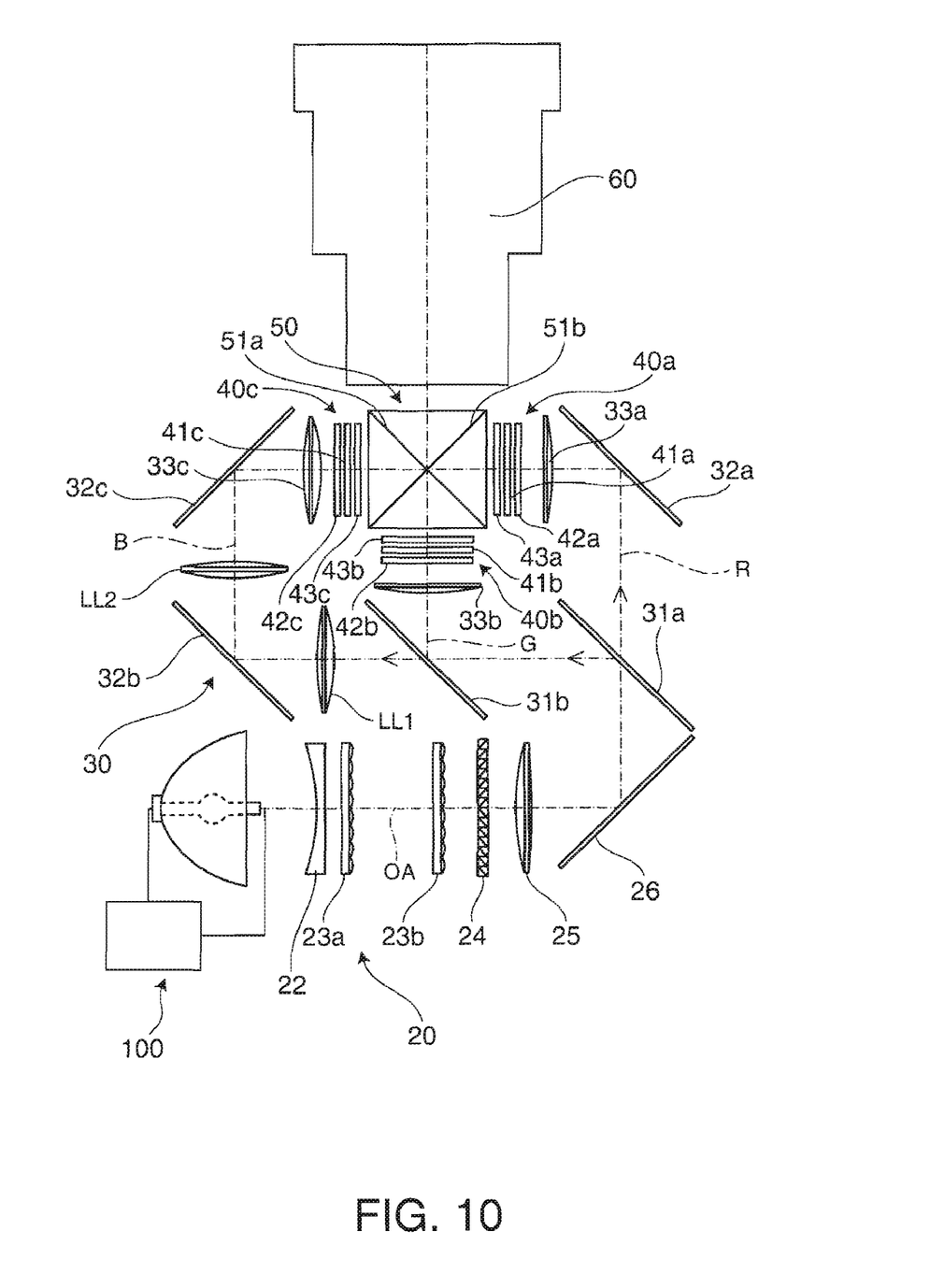
FIG. 10 illustrates a concept of a projector according to a second embodiment.

FIG. 10 illustrates a concept of the projector according to the second embodiment. A projector 200 in this embodiment includes the light source device 100, an illumination optical system 20, a color division optical system 30, liquid crystal light valves 40a, 40b and 40c as light modulating devices, a cross dichroic prism 50, and a projection lens 60 as a projection optical system. The light source device 100 is identical to that used in the first embodiment, and thus explanation of this device is not repeated herein.

The illumination optical system 20 has a collimating lens 22 as a light collimating unit which collimates the light directions of source lights, first and second fly-eye lenses 23a and 23b which constitute an integrator optical system for dividing light into lights and superposing the divided lights, a polarization conversion element 24 which equalizes polarization directions of lights, a superposing lens 25 which superposes lights having passed through the fly-eye lenses 23a and 23b, and a mirror 26 which bends the optical path of light. By using these components, the illumination optical system 20 forms equalized illumination light. In the illumination optical system 20, the collimating lens 22 converts the source lights into substantially collimated lights. Each of the first and second fly-eye lenses 23a and 23b constituted by a plurality of element lenses disposed in matrix divides the lights having passed through the collimating lens 22 and individually converges and diverges the divided lights. The polarization conversion element 24 is constituted by a PBS array, and has a function of converting the polarization directions of the respective partial lights divided by the first fly-eye lens 23a into one-directional linear polarized lights. The superposing lens 25 appropriately converges the entire illumination lights having passed through the polarization conversion element 24 such that the illumination lights can be superposed on the illuminated areas of following the liquid crystal light valves 40a, 40b and 40c as the light modulating devices for the respective lights.

The color division optical system 30 has first and second dichroic mirror 31a and 31b, reflection mirrors 32a, 32b and 32c, and three field lenses 33a, 33b and 33c. The color division optical system 30 divides the illumination light formed by the illumination optical system 20 into lights in three colors of red (R), green (G) and blue (B), and guides the respective color lights to the following liquid crystal light valves 40a, 40b and 40c. More specifically, the first dichroic mirror 31a initially transmits the R light of the lights in three colors R, G and B and reflects the light and B light. The second dichroic mirror 31b transmits the G light of the lights in two colors G and B and reflects the B light. Then, in the color division optical system 30, the R light having passed through the first dichroic mirror 31a passes through the reflection mirror 32a and enters the field lens 33a for controlling the incident angle. The G light reflected by the first dichroic mirror 31a and further reflected by the second dichroic mirror 31b enters the field lens 33b for controlling the incident angle. The B light having passed through the second dichroic mirror 31b passes through relay lenses LL1 and LL2 and the reflection mirrors 32b and 32c and enters the field lens 33c for controlling the incident angle.

The liquid crystal light valve 40a, 40b and 40c are non light emission type light modulating devices for modulating the spatial intensity distribution of entering illumination light. The liquid crystal light valves 40a, 40b and 40c have three liquid crystal panels 41a, 41b and 41c illuminated by the corresponding color lights emitted from the color division optical system 30, three first polarization filters 42a through 42c disposed on the entrance sides of the respective liquid crystal panels 41a through 41c, and three second polarization filters 43a through 43c disposed on the exit sides of the liquid crystal panels 41a through 41c The R light having passed through the first dichroic mirror 31a enters the liquid crystal light valve 43a via the field lens 33a and other components to illuminate the liquid crystal panel 41a of the liquid crystal light valve 40a. The G light having reflected by both the first and second dichroic mirrors 31a and 31b enters the liquid crystal light valve 40b via the field lens 33b and other components to illuminate the liquid crystal panel 41b of the liquid crystal light valve 40b. The B light having been reflected by the first dichroic mirror 31a and having passed through the second dichroic mirror 31b enters the liquid crystal light valve 40c via the field lens 33c and other components to illuminate the liquid crystal panel 41c of the liquid crystal light valve 40c. The respective liquid crystal panels 41a through 41c modulate the spatial intensity distribution of the polarization direction of the entering illumination light. The polarization conditions of the respective lights in three colors having entered the corresponding liquid crystal panels 41a through 41c are controlled per pixel according to a driving signal or an image signal inputted into the liquid crystal panels 41a through 41c as an electric signal. In this step, the polarization directions of the illumination lights entering the respective liquid crystal panels 41a through 41c are controlled by the first polarization filters 42a through 42c, and modulated lights having predetermined polarization directions are extracted from the modulated lights emitted from the respective liquid crystal panels 41a through 41c by using the second polarization filters 43a through 43c. By these processes, the respective light valves 40a, 40b and 40c form image lights in corresponding colors.

The cross dichroic prism 50 synthesizes the image lights in the respective colors emitted from the liquid crystal light valves 40a, 40b and 40c. More specifically, the cross dichroic prism 50 has substantially square shape in the plan view formed by affixing four rectangular prisms A pair of dielectric multilayer films 51a and 51b crossing each other in X shape are provided on the boundaries between the affixed rectangular prisms. The first dielectric multilayer film 51a of the two films reflects R light, and the other second dielectric multilayer film 51b reflects B light. The cross dichroic prism 50 reflects the R light coming from the liquid crystal light valve 40a by using the dielectric multilayer film 51a such that the R light can be emitted to the right with respect to the light traveling direction, directs the G light coming from the liquid crystal light valve 40b in such a direction as to advance straight to the following stage by using the dielectric multilayer films 51a and 51b, and reflects the B light coming from the liquid crystal valve 40c by using the dielectric multilayer film 51b such that the B light can be emitted to the left with respect to the traveling direction. By this method, the cross dichroic prism 50 synthesizes the R light, G light and B light into synthesis light as image light producing a color image.

The projection lens 60 enlarges the image light constituted by the synthesis light formed by the cross dichroic prism 50 with a desired enlargement ratio and projects a color image on a screen (not shown).

The projector 200 according to this embodiment uses the light source device 100 described in the first embodiment. Thus, early deterioration of the light source is prevented and its life is prolonged. Accordingly, the number of times of replacement of the light source can be reduced.

Obviously, the invention is not limited to the embodiments described and depicted herein, and various modifications and changes may be made without departing from the scope of the invention. For example, the following modifications are possible.

According to this embodiment, the projector 200 uses the pair of the fly-eye lenses 23a and 23b for dividing light from the light source device 100 into plural partial lights. However, the invention is applicable to a projector having no fly-eye lens of this type, i.e., a lens array. It is also possible to use a rod integrator instead of the fly-eye lenses 23a and 23b.

While the projector 200 uses the polarization conversion element 24 which converts light from the light source device 100 into polarized light having a particular direction, the invention is applicable to a projector which does not include the polarization conversion element 24.

While the invention has been applied to the transmission type projector in this embodiment, the invention is also applicable to a reflection type projector. The "transmission type" herein refers to a type in which a liquid crystal light valve containing a liquid crystal panel or the like transmits light. The "reflection type" refers to a type in which a liquid crystal light valve reflects light. In case of the reflection type projector, the liquid crystal light valve can be constituted by only a liquid crystal panel without necessity for including a pair of polarization filters. The light modulating device is not limited to the liquid crystal panel or the like, but may be a light modulating device using a micro-mirror.

There are currently two types of projector: a front projector which projects an image from the side where the projection surface is viewed; and a rear projector which projects an image from the side opposite to the side where the projection surface is viewed. The structure of the projector shown in FIG. 10 is applicable to both of these types.

According to this embodiment, only the example of the projector 200 having the three liquid crystal panels 41a through 41c is shown. However, the invention is applicable to a projector having only one liquid crystal panel, two liquid crystal panels, or four or more liquid crystal panels.

According to this embodiment, light modulation in the respective colors are performed by using the color division optical system 30, the liquid crystal light valves 40a, 40b and 40c, and other components. However, light modulation in the respective colors and synthesis may be executed by using a color wheel illuminated by the light source device 100 and the illumination opt ca system 20, and a device constituted by pixels of a micro-mirror and receiving light having passed through the color wheel used in combination.

The entire disclosure of Japanese Patent Application No. 2007-026454, filed Feb. 6, 2006 is expressly incorporated by reference herein.

What is claimed is:

1. A light source device, comprising:
    a first electrode and a second electrode which cause light emission by electrical discharge between each other;
    a light emitting tube having a main body containing a discharge space which separates the first and second electrodes disposed within the main body, and sealing portions provided at both ends of the main body;
    a main reflection mirror disposed on the first electrode side to reflect source light generated by the discharge between the first and second electrodes and emit the reflected light toward an illuminated area;
    a sub reflection mirror disposed on the second electrode side at a position opposed to the main reflection mirror to reflect the source light toward the main reflection mirror side; and
    a current driving device which supplies alternating current for causing electrical discharge between the first and second electrodes to the first and second electrodes, and performs power control such that supply energy during an anode period of the first electrode becomes smaller than supply energy during a cathode period of the first electrode at least a predetermined period immediately before a stable operation starts in the period from the start of power supply to the first and second electrodes to the start of the stable operation.

2. The light source device according to claim 1, wherein the current driving device supplies substantially constant current to the first and second electrodes during the period from the start of power supply to the first and second electrodes to the start of the stable operation.

3. The light source device according to claim 1, wherein the current driving device performs the power control by controlling time ratio of the anode period to the cathode period of the first electrode.

4. The light source device according to claim 1, wherein the current driving device performs the power control by controlling current ratio of the anode period to the cathode period of the first electrode.

5. The light source device according to claim 1, wherein:
    the main reflection mirror and the sub reflection mirror have reflection curved surfaces which are substantially axis-symmetrical with respect to an optical axis; and
    the electrode axes of the first and second electrodes are disposed at positions substantially coinciding with the position of the optical axis.

6. A projector, comprising:

the light source device according to claim 1;

a light modulating device illuminated by illumination light emitted from the light source device; and a projection optical system which projects image light having passed through the light modulating device.

7. The projector according to claim 6, wherein the current driving device supplies substantially constant current to the first and second electrodes during the period from the start of power supply to the first and second electrodes to the start of the stable operation.

8. The projector according to claim 6, wherein the current driving device performs the power control by controlling time ratio of the anode period to the cathode period of the first electrode.

9. The projector according to claim 6, wherein the current driving device performs the power control by controlling current ratio of the anode period to the cathode period of the first electrode.

10. The projector according to claim 6, wherein:

the main reflection mirror and the sub reflection mirror have reflection curved surfaces which are substantially axis-symmetrical with respect to an optical axis; and the electrode axes of the first and second electrodes are disposed at positions substantially coinciding with the position of the optical axis.

\* \* \* \* \*